United States Patent

[11] 3,568,861

[72] Inventors Wayne G. Atwater
Willoughby;
Sanford Saul, Cleveland, Ohio
[21] Appl. No. 764,504
[22] Filed Oct. 2, 1968
[45] Patented Mar. 9, 1971
[73] Assignee The Triax Company
Cleveland, Ohio

[54] POSITIVE LOCATING DEVICE FOR LOAD CARRIER IN AUTOMATIC WAREHOUSING SYSTEM
10 Claims, 10 Drawing Figs.

[52] U.S. Cl. .................................................. 214/16.4, 104/48
[51] Int. Cl. .................................................. B65g 1/06
[50] Field of Search ........................................ 214/16.1, 16.4, 16.42; 104/48, 49, 50

[56] References Cited
UNITED STATES PATENTS
| | | | |
|---|---|---|---|
| 718,543 | 1/1903 | Starks | 214/16.4(2) |
| 1,768,360 | 6/1930 | Jenney | 214/16.1(8A) |
| 2,019,182 | 10/1935 | Gipe et al. | 104/50 |
| 2,073,721 | 3/1937 | Wheelock | 214/16.1(6B) |
| 2,565,740 | 8/1951 | Robertson et al. | 214/16.1(8B) X |
| 2,916,166 | 12/1959 | Bigler | 214/16.1(8B) |
| 3,217,906 | 11/1965 | Crile et al. | 214/16.4 |
| 3,402,835 | 9/1968 | Saul | 214/16.4(2) |

Primary Examiner—Gerald M. Forlenza
Assistant Examiner—Raymond B. Johnson
Attorney—Baldwin, Egan, Walling and Fetzer ABSTRACT: An automatic warehousing system comprising a storage structure defining a plurality of load handling storage locations and an automatic load carrier movable alongside the storage structure for delivering loads to and/or picking up loads from the load storage locations. Automatic locating means is provided adapted for movement from an inactive position to an active position, for coaction between the storage structure and the load carrier to mechanically couple the load carrier in predetermined position with respect to a selected one of the storage locations, so that the laterally movable extractor of the load carrier will be in proper position with respect to the selected load storage location for inserting a load into or removing a load from the selected location. Circuit means is provided with control means in the circuit means so that the load carrier cannot be energized to move longitudinally with respect to the storage structure when the locating means is in its activated position between the storage structure and the load carrier, with such circuit means also including means for permitting extractor movement only when the locating means is in its activated position.

INVENTORS
WAYNE G. ATWATER
BY SANFORD SAUL

ATTORNEYS

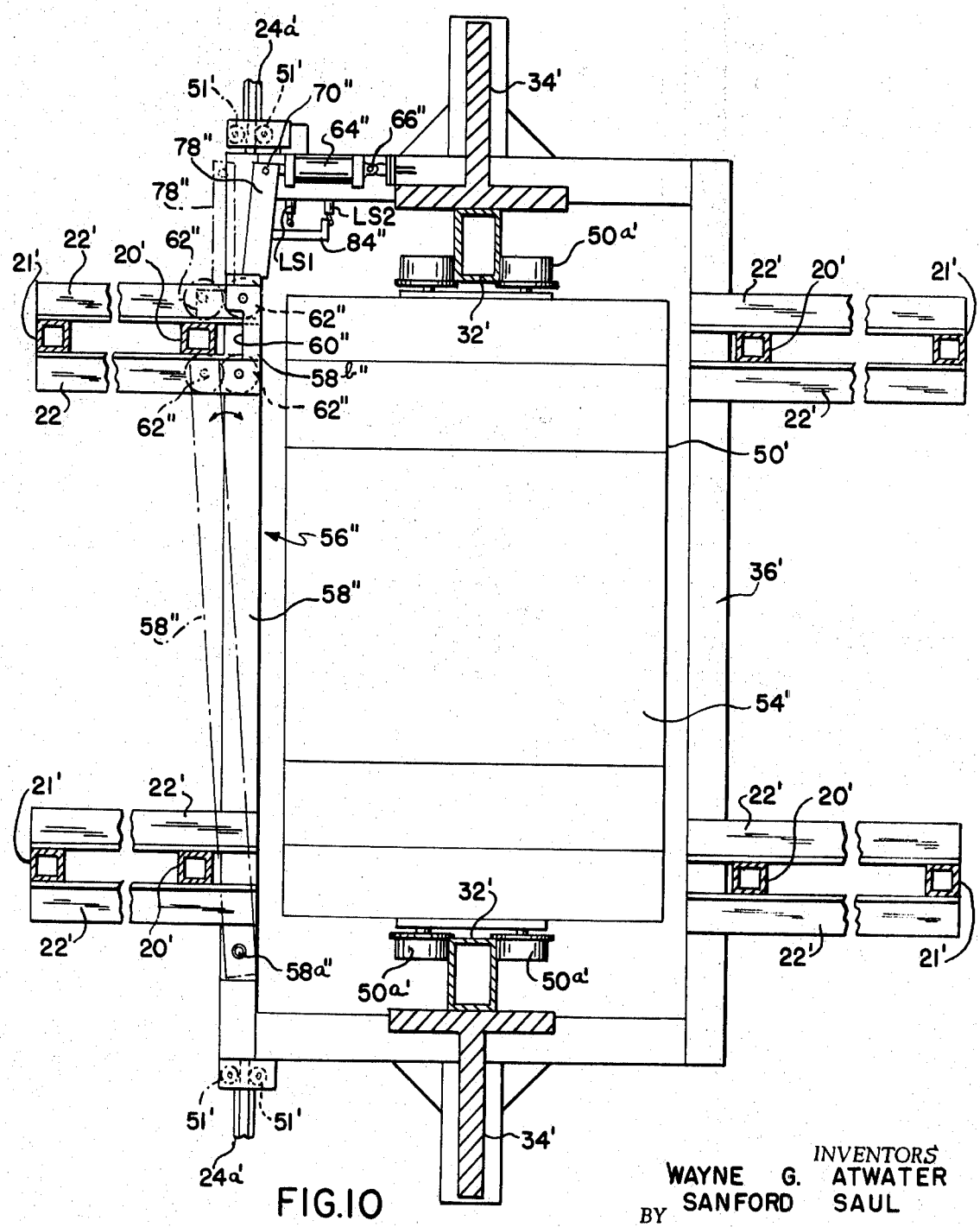

POSITIVE LOCATING DEVICE FOR LOAD CARRIER IN AUTOMATIC WAREHOUSING SYSTEM

This invention relates in general to automatic warehousing systems for storing and unstoring loads by transferring them between a movable load carrier and a storage frame and more particularly relates to a warehousing arrangement wherein the load carrier is of generally vertically elongated construction and with automatic locating means being provided for coaction between the storage structure and the load carrier for maintaining positive alignment between the load carrier and the selected storage location during the handling cycle of the extractor of the load carrier.

The problem of maintaining rigidity in a load carrier which is of a much greater height than its width and breadth and of maintaining alignment between the load carrier and a selected storage location or storage bin of the storage structure, in the handling cycle of the load carrier, is a quite difficult one, especially as warehousing systems become larger with resultant increases in the height of the storage structure and the height of the associated load carrier structure. Good alignment between the load carrier and the storage structure is necessary to a selected load storage location so that the extractor will be in proper position with respect to the storage frame for inserting or removing a load from the selected storage bin at each load handling position.

The present invention provides a novel automatic locating device for a warehousing system which locating device is adapted to coact between the load carrier and the storage structure and to hold or grip the storage structure and the load carrier and retain the load carrier in predetermined position with respect to a selected storage bin location during the load handling cycle of the extractor of the load carrier. Accordingly, the extractor of the load carrier will be in proper position for moving a load into or from the confronting storage bin or storage location in noninterfering relation with the storage structure.

Accordingly, an object of the invention is to provide a novel warehousing system.

A further object of the invention is to provide a novel warehousing system having a powered load carrier for depositing loads into and/or removing loads from the storage structure or storage frame in the system, and wherein the load carrier is of elongated upright construction and embodies automatic locating means adapted for coaction between the storage structure and the load carrier for positively locating the load carrier with respect to a selected storage bin location, thus ensuring that the extractor of the load carrier will be in proper position with respect to the storage means, for inserting a load into or removing a load from the selected storage bin.

A still further object of the invention is to provide an automatic warehousing system in accordance with the foregoing wherein the load carrier comprises a laterally movable extractor portion adapted to support a load and transfer it between the storage structure and the load carrier, and including control means for permitting extractor movement to handle a load at the selected storage bin only when the locating means is in active position between the storage structure and the load carrier.

A still further object of the invention is to provide an automatic warehousing system in accordance with the above wherein the control means includes means for preventing energization of the power means controlling longitudinal movement of the load carrier with respect to the storage structure unless the locating means is in its nonactive position.

A still further object of the invention is to provide an automatic warehousing system wherein the load carrier comprises a horizontally movable vertically elongated conveyor portion, a vertically movable elevator portion mounted on the conveyor portion and an extractor portion mounted on the elevator portion adapted for lateral movement with respect thereto for handling a load at a selected load storage location, and wherein the conveyor portion includes a generally horizontally oriented carriage disposed adjacent a vertical end of the conveyor portion and rail means supporting the carriage for horizontal movement of the load carrier with respect to the storage structure, and with the locating means being disposed adjacent the other end of said conveyor portion, or in other words the end opposite to the carriage end of the conveyor portion.

A still further object of the invention is to provide an automatic warehousing system in accordance with the above wherein the carriage is disposed adjacent the upper end of the conveyor portion and is mounted on track means supported by the storage structure, with the locating means being disposed adjacent the lower end of the conveyor portion.

A still further object of the invention is to provide an automatic warehousing system in accordance with above wherein the carriage portion is disposed adjacent the bottom end of the vertically elongated conveyor portion, and the locating means is disposed adjacent the upper end of the conveyor portion, with the supporting rail means being mounted in the travel zone on the floor of the warehousing system.

A still further object of the invention is to provide an automatic warehousing system in accordance with the above wherein the locating means comprises an elongated member pivoted to the load carrier for movement in a generally horizontal plane, and with the elongated member including spaced rollers means thereon which are adapted for abutting coaction with vertical posts of the storage structure, for gripping the storage structure and locating the load carrier in predetermined position with respect to a selected load storage location in the storage structure.

Other objects and advantages of the invention will be apparent from the following description taken in conjunction with the accompanying drawings, wherein:

FIG. 1 is a fragmentary, broken, end elevational view of a storage structure or storage frame having an aisle in the middle thereof and with a load carrier disposed in the aisle and movable on track means mounted on the floor level of the warehousing system, and with the locating means of the invention disposed adjacent the upper end of the vertically elongated conveyor portion of the load carrier; this general type of load carrier may be hereinafter referred to as a floor running load carrier;

Figure 4:
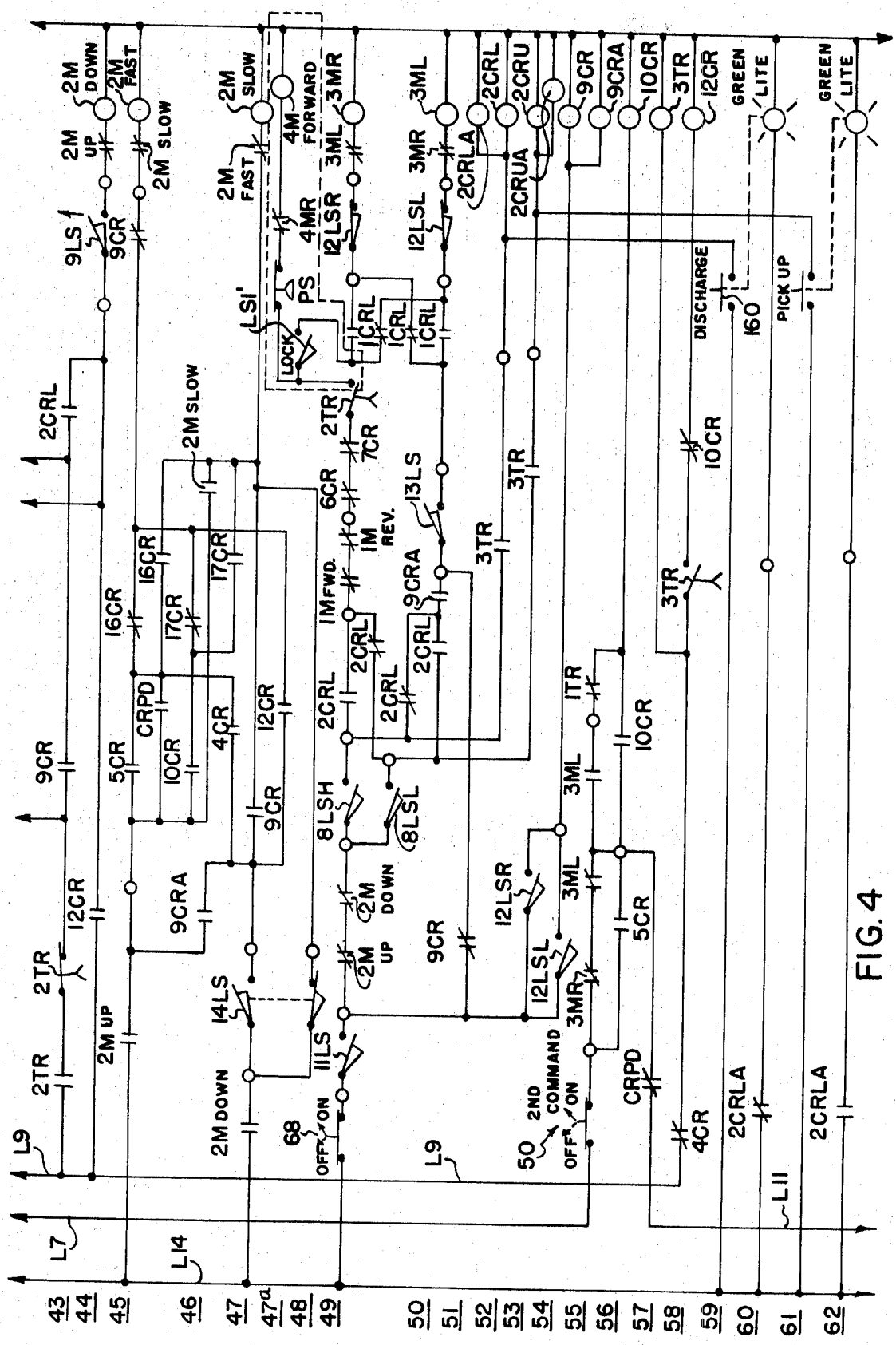

FIG. 4 is a schematic of a portion of a control circuitry for controlling the actuation of the load carrier of the system and for synchronizing the actuation and deactuation of the locator mechanism with the movement of the extractor mechanism and the conveyor portion of the load carrier; FIG. 4 is generally similar to FIG. 9E of the copending U.S. Pat. application, Ser. No. 418,048 of Sanford Saul entitled "Electrical Control Circuit for an Automatic Warehousing System" and filed Dec. 14, 1964, but with the addition thereto of circuitry outlined in phantom lines, for facilitating identification thereof.

Figure 5:
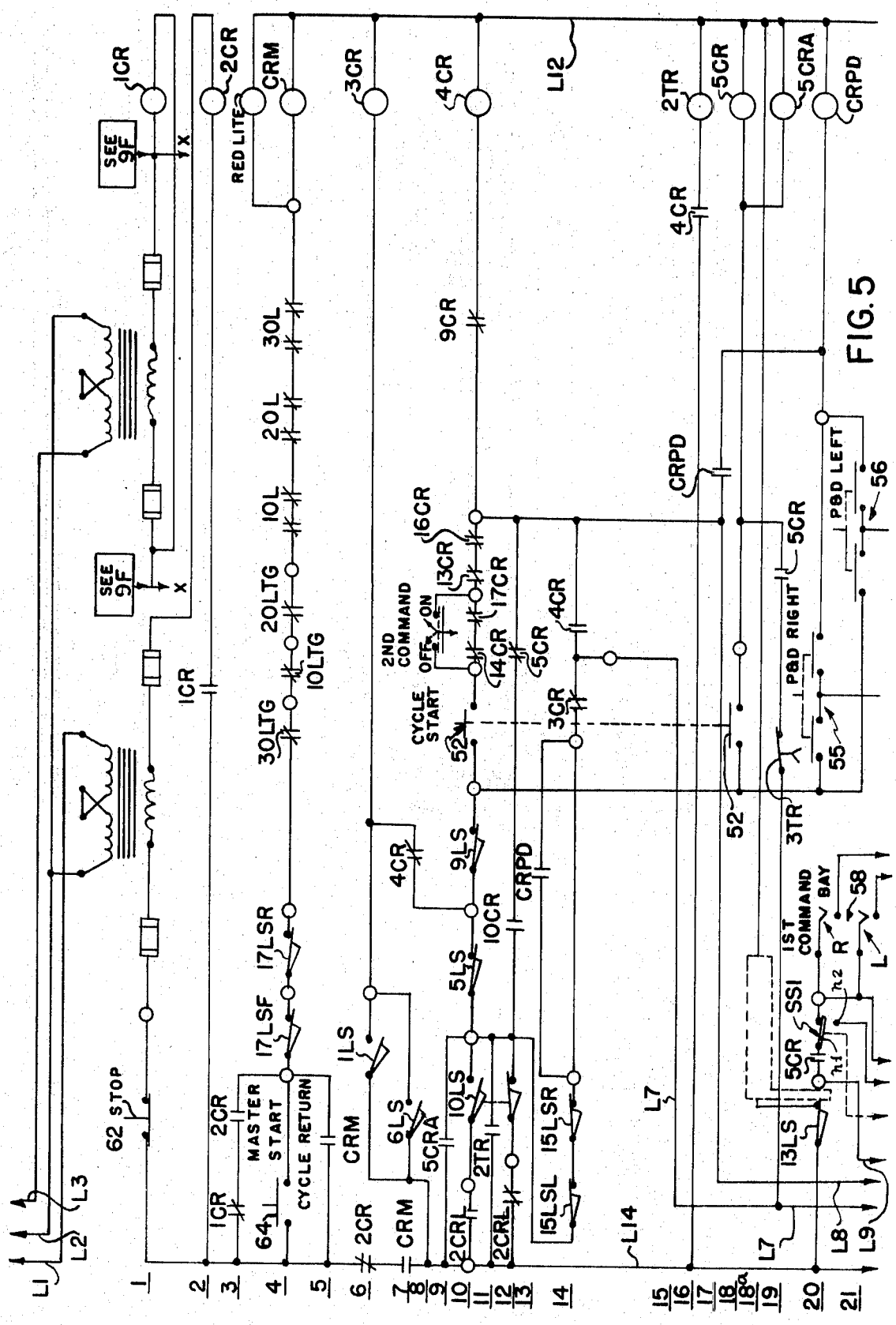

FIG. 5 is a schematic of another portion of control circuitry for controlling the operation of the load carrier in its load handling cycle, with FIG. 5 being generally similar to FIG. 9B of the aforementioned U.S. Pat. application 418,048; there is shown by means of a phantom lined polygon in line 18a of FIG. 5 the changes in the FIG. 5 circuitry as compared to the aforementioned FIG. 9B of Ser. No. 418,048.

Figure 1:
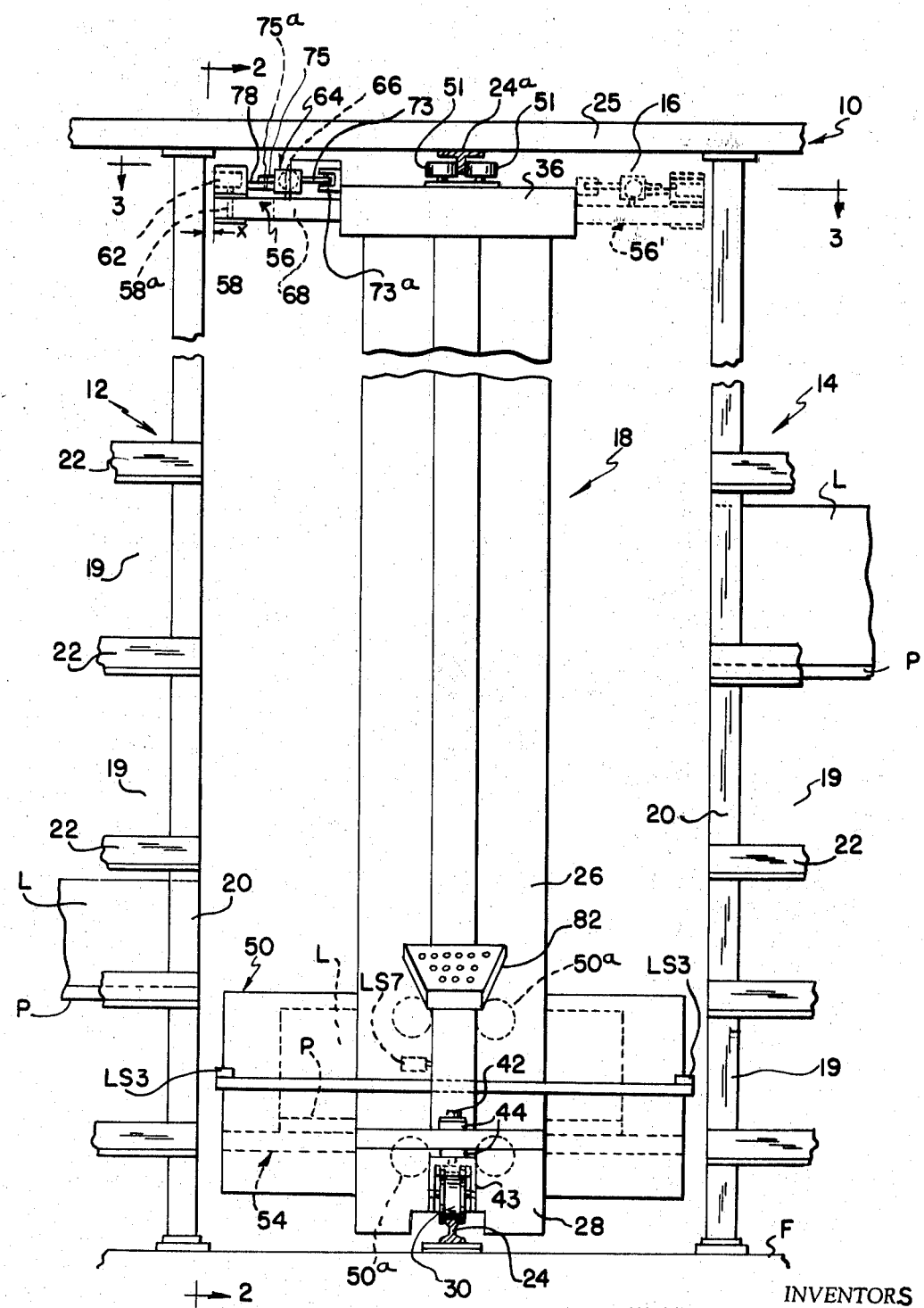
Figure 2:
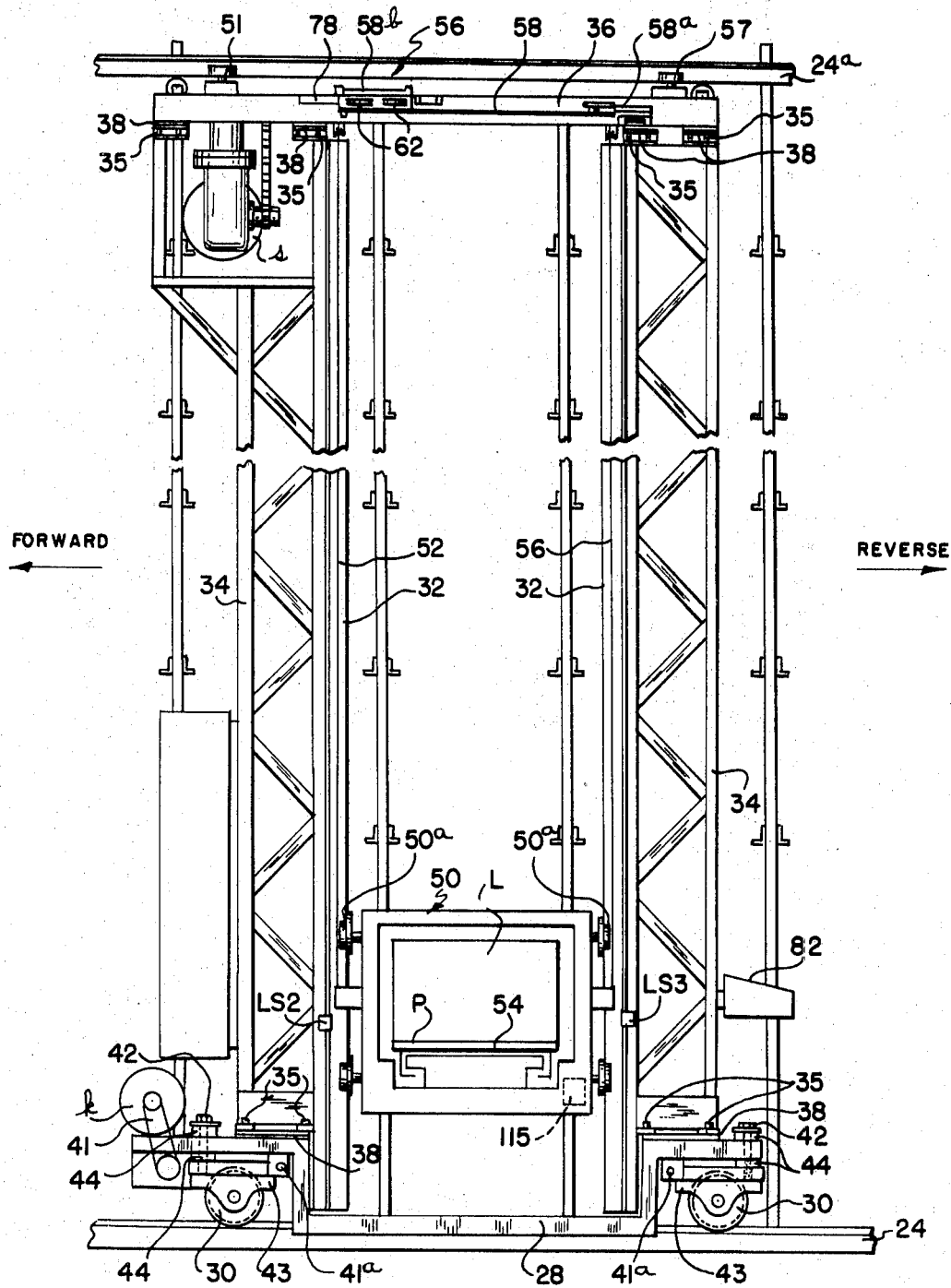
FIG. 2 is a side elevational view taken generally along the plane of line 2-2 of FIG. 1 looking in the direction of the arrows.
Figure 3:
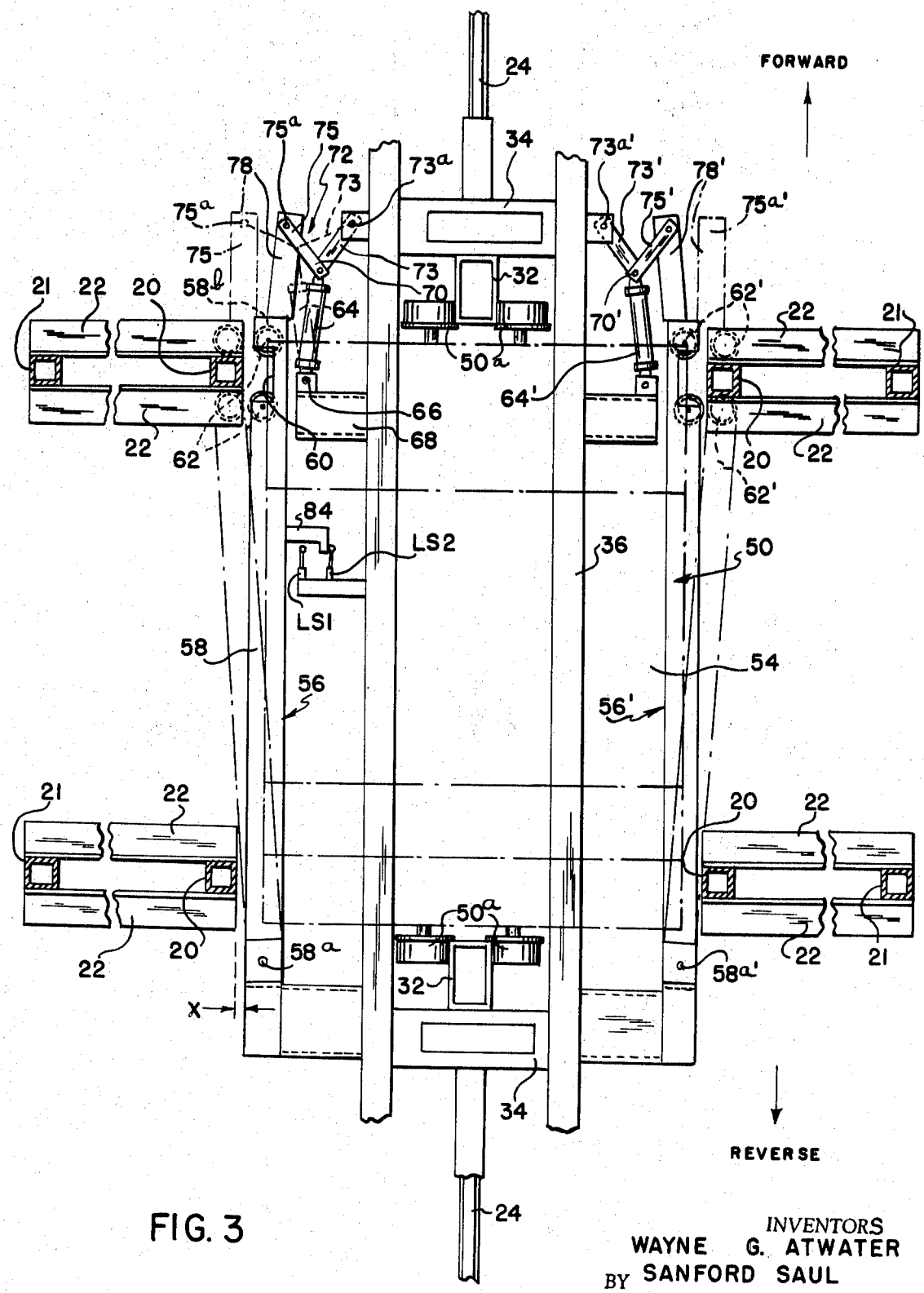
FIG. 3 is a fragmentary top plan sectional view taken generally along the plane of line 3-3 of FIG. 1 looking in the direction of the arrows.
Figure 6:
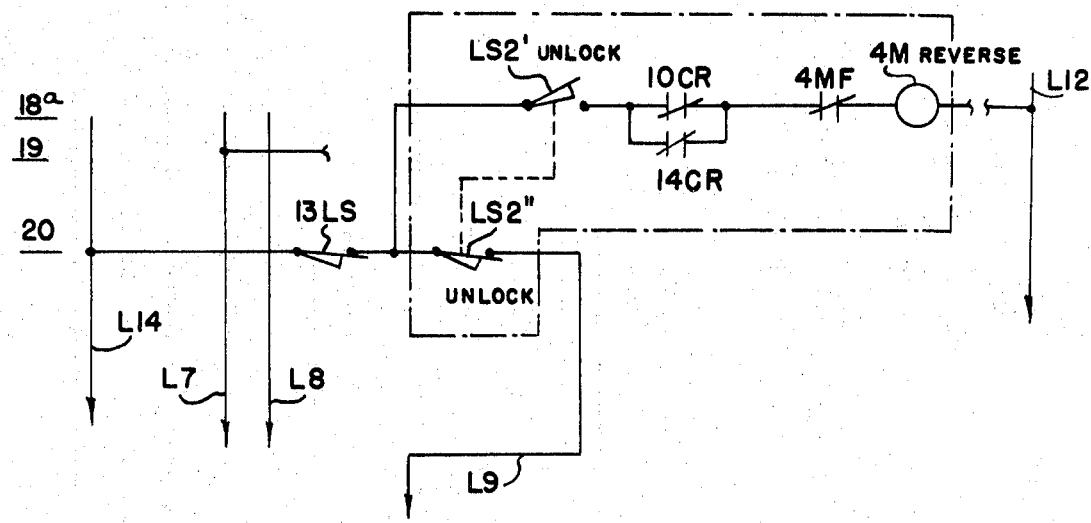
Figure 7:
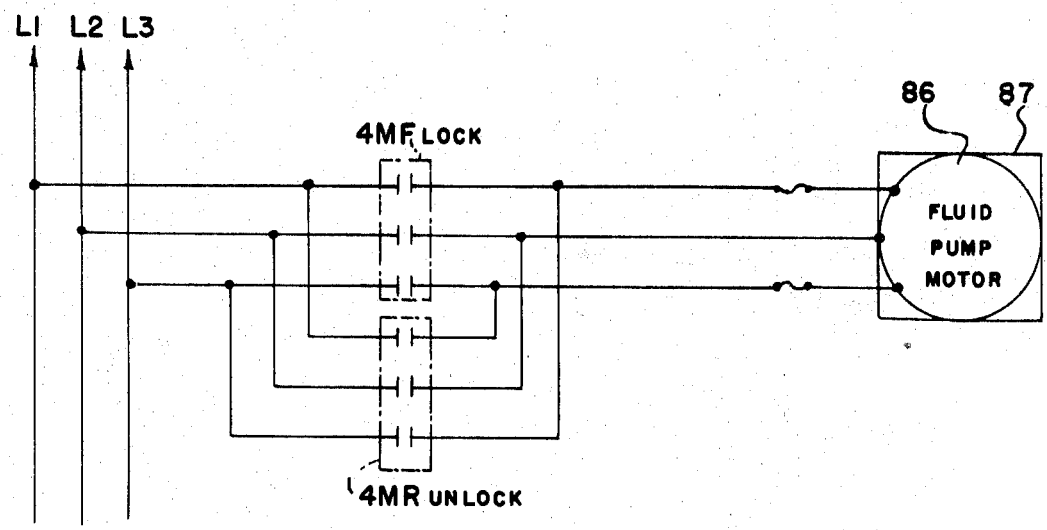
Figure 8:
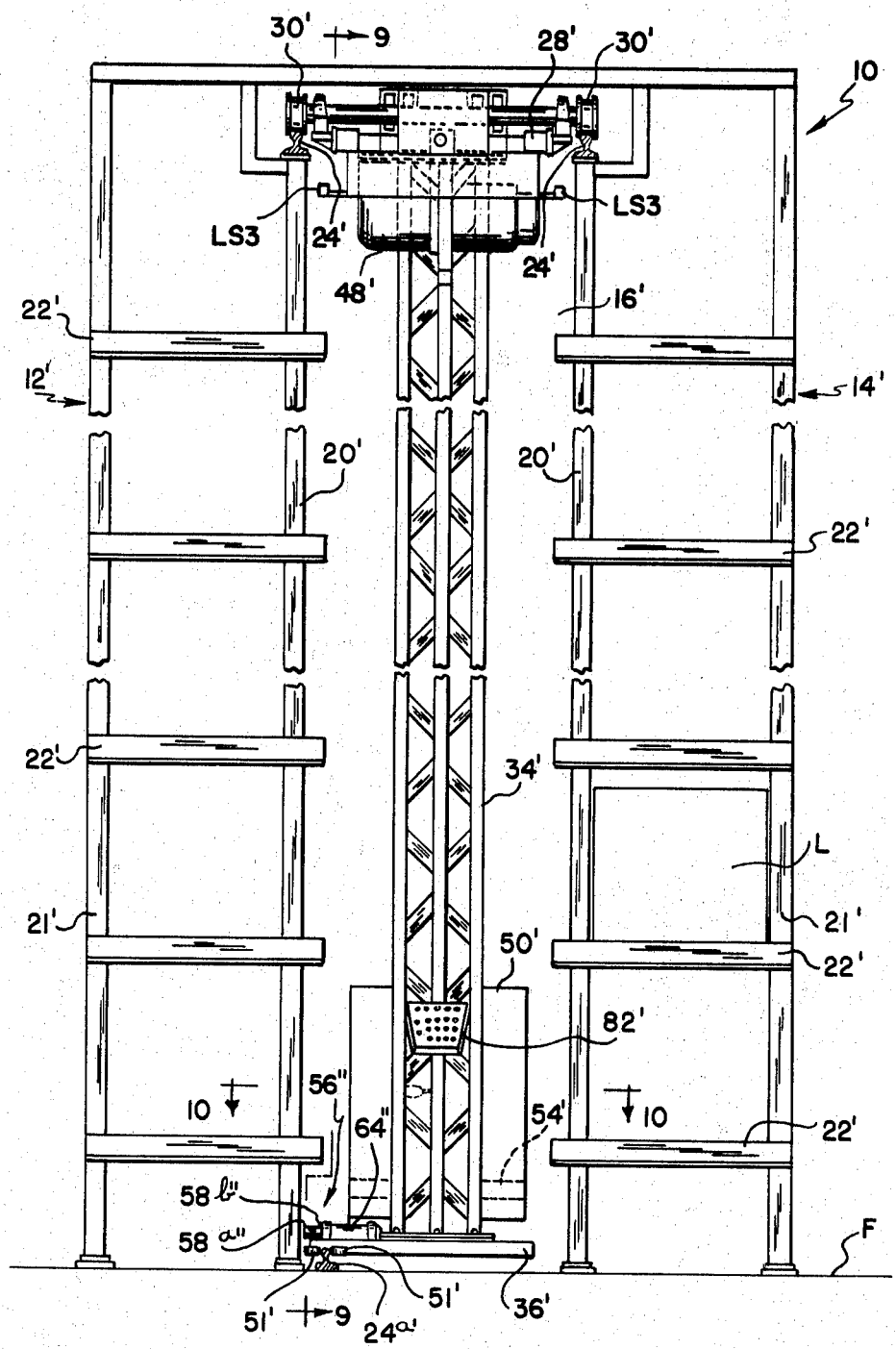
Figure 9:
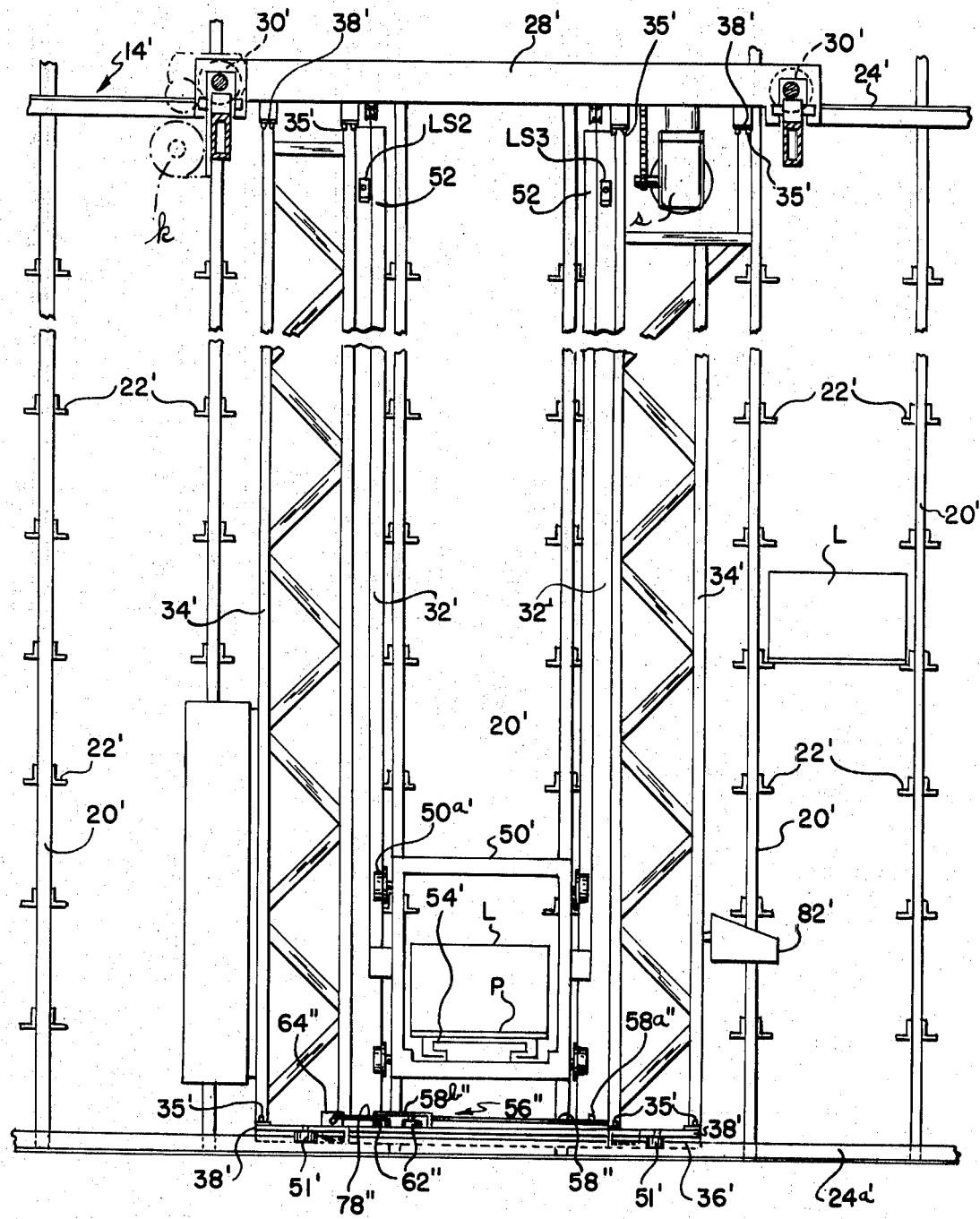

FIG. 6 is an enlarged detailed view of the control circuitry disposed within the phantom line polygon of FIG. 5;

FIG. 7 is a fragmentary schematic illustrating the power circuitry for the pump motor for controlling actuation of a pump which pump is adapted to furnish pressurized fluid to a motor unit, to actuate and deactuate the locating mechanism of FIGS. 1 through 3;

FIG. 8 is an end elevational view generally similar to FIG. 1 but illustrating a modified arrangement of warehousing system, and one wherein the load carrier is mounted on rail means supported by the storage structure, for movement of the load carrier in its travel zone lengthwise of the latter; this arrangement of warehousing system may be hereinafter referred to as a top running load carrier arrangement;

FIG. 9 is a sectional elevational view taken generally along the plane of lines 9–9 of FIG. 8 looking in the direction of the arrows; and FIG. 10 is a horizontal sectional view taken generally along the plane of line 10–10 of FIG. 8 looking in the direction of the arrows, and illustrating in particular the locating mechanism disposed adjacent the bottom extremity of the vertically elongated load carrier.

Referring now again to the drawings, the warehousing system illustrated comprises a skeletal storage structure or framework 10, comprised, in the embodiment illustrated, of parallel storage bank sections 12 and 14 defining therebetween a travel zone or aisle 16, so as to permit a motorized load carrier, indicated generally at 18, to be moved along the aisle or travel zone 16 and to insert and withdraw loads or articles from the storage bins 19 formed by the storage sections 12 and 14.

Each storage section may be constructed of a plurality of vertically extending posts, including aisle posts 20, and outer posts 21 (FIG. 3) spaced apart and connected by a plurality of generally horizontally extending load supporting members or rails 22, defining the aforementioned storage bins 19. The load supporting members 22 have open load receiving ends defining a generally vertical plane along which the load carrier 18 is adapted for movement, with horizontally aligned pairs of the load supporting members 22 being adapted to receive the edges of a load in bridging relationship thereacross, for supporting the load on the storage structure. The instant arrangement of warehousing storage frame structure may be generally similar to that disclosed in U.S. Pat. No. 3,371,804 issued Mar. 5, 1968 in the name of A. R. Chasar and entitled "Automatic Warehousing System," and reference may be had thereto for a more detailed description of suitable storage frame construction.

The load carrier 18, in the embodiment illustrated in FIGS. 1 to 3, is mounted upon a base rail 24 extending lengthwise of the travel zone 16 and carried by the floor F, with load carrier 18 being stabilized at the upper end thereof by an overhead rail 24a carried by cross members 25 (FIG. 1) extending between storage sections 12 and 14. Rails 24, 24a preferably extend outwardly of the storage sections at one end thereof, for positioning the load carrier in front of the storage sections and at a pickup and discharge station or stations (not shown) from which position the load carrier may start its movement into the aisle or travel zone to deposit and/or pickup loads in the storage sections.

The load carrier 18 may comprise a generally horizontally movable conveyor portion or frame 26 which is of vertically elongated construction extending for substantially the full height of the storage structure, and which comprises in the embodiment illustrated, a lower carriage 28 of generally U-shaped configuration in side elevation (FIG. 2) having centrally oriented wheels 30 rotatably mounted thereon, for supporting the load carrier on the rail 24 running lengthwise of the travel zone, and an upper frame section 36.

Conveyor portion 26 may also include generally vertically extending mast structure comprising longitudinally spaced hollow track members 32 (FIGS. 2 and 3). Each track 32 may be reinforced as by means of an associated truss structure 34, suitably attached, as by welds, to the respective track member 32. The mast structure 32 and associated reinforcing truss structure 34 may extend between the lower carriage 28 and upper frame section 36 (FIGS. 2 and 3) of the conveyor portion 26 of the load carrier, and may be secured thereto as at 35 in generally rigid relationship. Removable spacer means such as shims 38 may be provided coacting with the junctures of the truss structure and upper and lower conveyor sections 36, 28 for adjusting the connections between the latter.

Lower carriage section 28 of the load carrier may be driven by means of a preferably reversible electric motor $k$ (FIG. 2) mounted on the carriage 28 and operably coupled as by means of drive mechanism 41 to at least one of the supporting wheels 30, for powering the load carrier along rail 24. Each wheel 30 may be movably coupled as at 41a to the carriage section 28 for limited pivotal movement in a generally vertical plane. A bolt 42 coacting between the carriage 28 and the respective wheel mounting 43 may be provided for holding the wheels and associated mountings to the carriage 28. Resilient pads, such as rubber pads 44, may be provided adjacent opposite ends of the connecting bolt 42 and between the upper and under surfaces of the associated carriage portion. It will be seen that such a resilient mounting arrangement of wheels 30 provide for some limited movement in a generally longitudinally extending vertical plane of the lower carriage 28, the upper conveyor section 36, and attached mast and truss structure 32, 34 and with respect to the wheels 30.

The aforementioned upper section 36 of the conveyor portion may take the form of a rectangular framework supporting a preferably reversible electric motor $s$ thereon, which is operably coupled to the elevator portion 50 of the load carrier in a known manner, for moving the elevator portion vertically on the mast tracks 32. Upper frame 36 may have spaced idler rollers 51 rotatably mounted thereon, which rollers coact in rolling engagement with aforementioned upper rail member 24a running lengthwise of the aisle of the warehousing system, for guiding the longitudinal movement of the upper end of the conveyor portion.

Elevator 50 may comprise vertically spaced sets of rollers 50a rotatably mounted thereon and adapted for rolling coaction with aforementioned tracks 32 of the mast structure, for guiding the vertical movement of the elevator portion with respect to the conveyor portion 26 of the load carrier.

Mounted on the elevator 50 may be an extractor mechanism 54 which is adapted to move laterally of the elevator with a load L supported thereon for depositing the load in a selected storage bin of the storage structure, or to move laterally of the elevator and pick up a load that is already in the storage structure and move it to another location in the storage structure or back to the pickup and discharge station of the warehousing system.

The extractor portion 54 preferably provides an extensible table with the table being extendible in either of the opposed directions transverse to the longitudinal direction of the movement of the load carrier in the travel zone, so as to locate the extractor within either of the storage sections associated with the travel zone effective to place the extensible table into position to deposit a load into or remove a load from the selected storage bin in the selected storage section. Suitable power means such as reversible electric motor 115 (FIG. 2) may be provided, operably coupled to the extractor for actuating the latter. Reference may be had to he aforementioned U.S. Pat. application 418,048 for a more detailed disclosure of suitable extractor mechanism. When depositing a load in one of the storage bins of the storage structure, the elevator 50 and associated extractor 54 may be located opposite the selected storage bin such that as the load is moved into the selected bin, the upper surface of the extractor is slightly above the horizontal flanges of the load supporting rails 22 mounted on the sides of the posts 20, 21, and defining the bottom extremity of the selected bin. When the load is completely within the confines of the bin, the extractor may be lowered slightly via the elevator to deposit the load onto the supporting load supporting rails 22 and permit retraction of the extractor back to its generally centered position with respect to the elevator. Conversely, when it is desired to remove a load from the bin, the extractor 54 on the elevator is located such that the top surface of the extractor is extended into the bin slightly below the load to be picked up. Thereafter, the extractor may be raised so as to lift the load off its supporting rail members 22, and the extractor is retracted back to its generally centered position preparatory to moving the load carrier to its next position in the load handling cycle.

In accordance with the present invention, there is provided automatic locating mechanism 56 (FIGS. 1, 2 and 3) adapted for coaction between the storage structure and the load carrier, for positively locating the load carrier with respect to a selected storage bin so that vertical alignment of the vertically elongated conveyor portion of the load carrier will be positively maintained with respect to the vertically extending post structure 20 of the selected storage section, thus assuring that the extractor can move a load into and from the storage bin in noninterfering relationship, whereupon when a load is moved into a bin, it will be supported in bridging relationship between the horizontally paired load supporting rails defining the bottom extremity of the selected bin. In this connection, the load L may be conventionally supported on a pallet P which is moved with the load and into bridging relationship across the associated pair of load supporting rails 22. It will be understood that due to the vertically elongated construction of the load carrier and the vertically elongated construction of the storage structure, that the upright mast structure of the load carrier may not remain in perfect vertical alignment with respect to the vertical post structure of the storage frame, and therefore a load carried by the extractor may not always be in perfect alignment with the defining sides of the storage bin. The present arrangement of automatic locating means insures that before a load is attempted to be inserted or removed from the selected storage bin, that the conveyor portion of the load carrier is placed in vertical alignment with the confronting aisle posts of the storage structure defining the bin, thereby insuring that no interference will occur between the load and the storage structure when the extractor portion 54 either removes a load from the storage structure or deposits a load therein.

The locating mechanism 56 in the embodiment illustrated comprises an elongated generally horizontally oriented member 58 (FIG. 3) pivotally connected as at 58a to the upper section 36 of the conveyor portion of the load carrier. Mechanism 56 extends for a substantial portion of the longitudinal dimension of the upper frame section 36, and in the embodiment illustrated, for a distance more than the longitudinal spacing between the vertical tracks 32 of the mast structure, and more than the distance between adjacent aisle posts 20 of the selected bin in the storage structure (FIG. 3). Adjacent the distal end of member 58 there is provided a housing portion 58b which is recessed as at 60 an amount greater than the width of an aisle post 20. Housing 58b has rollers 62 rotatably mounted therein in spaced relationship to one another, with the rollers being rotatable about generally vertical axes.

A double acting, fluid powered, reciprocal-type motor unit 64 is provided for actuating and deactuating the locating mechanism, with the motor unit 64 being, in the embodiment illustrated, pivoted as at 66 to bracket structure 68 secured to the upper frame section 36, and with the piston rod of the motor unit being pivoted as at 70 to linkage 72. One of the links 73 of linkage 72 is pivoted as at 73a to upper frame section 36, while the other end thereof is pivoted to the motor unit's piston rod, and the other link 75 of linkage 72 is pivoted as at 75a to generally horizontally oriented diagonally extending (in top plan - FIG. 3) element 78 which in turn is rigidly attached to housing member 58b.

It will be seen that extension of the motor unit 64 will cause the links 73, 75 to be moved outwardly, thus causing pivoting of the locating mechanism in a generally horizontal plane across the running clearance X (FIG. 3) between the load carrier and the storage frame whereupon the rollers 62 will engage in rolling coaction with the confronting aisle post 20 as it is received in recessed portion 60 of the housing 58b. Accordingly, if it so happens that the vertically elongated conveyor portion of the load carrier is not in good alignment with the aisle posts 20 of the confronting storage bin, the gripping coaction between the spaced rollers, which are spaced apart the width of the aisle posts, will cause the mast structure of the conveyor portion to be aligned with the aisle posts of the storage structure. Thus when the extractor commences to move a load into the confronting storage bin or commences to remove a load therefrom, the load can be handled without interference occuring between the load and the storage structure.

In this connection, the aforementioned resilient mounting 44 of the pivoted wheels 30 of the load carrier to the lower carriage 28 provides a certain amount of resilience to facilitate the action of the locating mechanism at the upper end of the load carrier in its operation of bringing the conveyor portion, including the mast structure, into alignment with the posts of the storage structure. Accordingly, no matter what level the extractor is positioned for inserting a load into or withdrawing a load from the storage structure, the load can be handled without interference with the storage structure. While a fluid powered motor unit has been mentioned for actuating and deactuating locating member 58, other types of power units such as electrical or mechanical could be used instead.

As can be seen in FIG. 3, locator mechanism may be provided on both sides of the load carrier for coaction with the respective left hand or right hand storage section of the storage structure. These plural locating mechanisms may be operated in unison, thus rigidly locating the load carrier with reference to both storage structures or the locating mechanism may be selectively operated for coaction with the respective storage section that the extractor is programmed to enter (i.e. either right or left). The locating mechanism on opposite sides of the load carrier may be of identical construction and thus in FIG. 3, the components of the right hand locating mechanism are identified with the same reference number as the left hand locating mechanism, but with the prefix prime being added thereto. However, it will be understood that only one locating mechanism may be utilized, if the single mechanism is deemed adequate for both storage sections.

The programmed operation of a load handling cycle for the load carrier may be controlled by an electrical control circuit generally similar to that disclosed for instance in the aforementioned U.S. Pat. application, Ser. No. 418,048 of Sanford Saul, and reference may be had thereto for a full description of such a control system. For example, with the load carrier disposed at a pickup and discharge station in the system, the load carrier may be automatically moved into the aisle or travel zone and located opposite the selected storage bin in either of the storage sections. At each programmed storage bin during the controlled interval, the extractor will be actuated so that a load will be deposited into or withdrawn from the bin. Console 82 (FIG. 2) has various controls thereon for actuation by the warehousing operator and may be mounted on the load carrier for programming of the load carrier, or the load carrier may be programmed from a location remote from the load carrier, such as for instance by a computer or the like, for controlling the positioning of the load carrier in the warehousing system. As is disclosed in aforementioned Ser. No. 418,048, the positioning circuitry for the load carrier may include counting sensors (such as for instance proximity switches LS2 and LS3) for counting the aisle posts 20, as the load carrier moves longitudinally in the travel zone, to automatically position the load carrier longitudinally at the selected bin column in the selected storage section. As shown in FIGS. 1 and 2, such counting sensors may be located adjacent one end of the conveyor portion (in the embodiment illustrated the lower or carriage end) while the automatic locating mechanism 56 is located adjacent the other end (i.e. the upper end) of the conveyor portion.

Referring now to FIGS. 3 through 7, there is illustrated control circuitry adapted for use in conjunction with the positioning control circuitry of aforementioned Ser. No. 418,048, so that extractor motion for handling a load at a selected storage bin location will be permitted only when the locating mechanism 56 is fully extended into gripping coaction (i.e. active position) with the storage structure, thus locking the load carrier to the storage structure, together with control mechanism for permitting horizontal or longitudinal movement of the load carrier only when the locating mechanism is fully retracted back from coaction with the storage structure (i.e. inactive position).

In this connection, pivotal member 58 of the locating mechanism may be provided with an actuator 84 which is adapted for coaction with limit switches LS1, LS2, (FIG. 3) of conventional type which may be mounted on the upper frame section 36 of the load carrier.

Referring now to FIGS. 3 and 6, it will be seen that when the locating mechanism 56 has been retracted to an inactive position, the actuator 84 maintains switch contact LS2' of switch LS2 open and maintains switch contact LS2'' of switch LS2 closed, while switch contact LS1' of switch LS1 (line 47a of FIG. 4) is a normally open contact and remains so in the inactive position of the locating mechanism. Operation of the positioning circuitry for the load carrier control system may be the same as described in aforementioned Ser. No. 418,048, so that as the load carrier moves in the aisle or travel zone 19 in its load handling cycle, the longitudinal sensors LS2, LS3 and the vertical sensor LS7 of the positioning circuitry for the load carrier are actuated and the load carrier is automatically positioned in front of the selected storage bin, at which time a readout occurs and power is adapted to be applied to the actuator motor 115 for the extractor mechanism 54 for performing its load handling operation.

Referring now to FIG. 4 which corresponds to FIG. 9E of Ser. No. 418,048 except for the added circuitry in the phantom lined polygon in line 47a thereof, when one of the limit switches 8LSH or 8LSL (lines 49 and 50) is closed due to positioning of the elevator either high or low depending on whether a load is to be deposited into or removed from the selected storage location, the coil of either motor relay 3ML or 3MR (lines 49 and 50) is adapted to become energized effective to power the drive motor 115 of the extractor to extend the extractor into the confronting bin. However, it will be seen from line 47a of FIG. 4, that in the selected position of the load carrier and prior to energization of the extractor motor relay 3MR or 3ML, energization of relay 4M Forward occurs.

Energization of relay 4M Forward causes closing of normally open contacts 4MF (FIG. 7) in the leads to the electric pump motor 86, thus causing energization of the latter which activates the associated fluid pump 87, to cause application of fluid pressure to the motor unit 64 (and 64' if a pair of locating mechanisms are utilized), and via conventional valve mechanism.

Actuation of the fluid motor 64 causes outward movement of the links 73, 75 as aforediscussed, thus causing pivoting of the locating mechanism across the running clearance X and into gripping coaction with the confronting post 20 of the storage structure. Rollers 62 on the locating mechanism are of relatively large diameter and act with the rolling action thereof to bring the upper end of the conveyor portion of the load carrier including the mast structure into alignment with the posts of the confronting bin of the storage structure. Such locating rollers are preferably rubber clad or made of some suitable resilient material to reduce the shock impact on the post members of the storage structure as they are engaged by the locating mechanism or mechanisms.

When the locating mechanism 56 is in full gripping or holding coaction with the confronting post, and alignment of the mast structure of the load carrier has occurred, then upon occurence of a predetermined pressure level in the fluid circuitry associated with the pump, pressure switch PS (line 47a FIG. 4) will open, thus deenergizing relay 4M Forward and causing motor 86 to be deenergized due to the opening of the relay contacts 4MF in the leads to the motor. Fluid motor 64 is thus locked in extended condition to maintain the locating mechanism in active position.

Referring now again to FIG. 3, it will be seen that upon pivotal movement of the locating mechanism away from its inactive position and toward the storage structure, the actuator 84 on pivotal member 58 disengages from the limit switch LS2 permitting its switch contacts LS2' and LS2'' (FIG. 6) to respectively close and open. Also when the locating mechanism 56 is in fully actuated condition gripping the confronting storage structure, the actuator 84 on member 58 will engage the control switch LS1, causing its switch contact LS1' (line 48, FIG. 4) to close. Since one or the other of the elevator positioning limit switches 8LSH or 8LSL have been previously closed as aforedescribed, power is furnished to one or the other of the extractor motor relays 3MR or 3ML, thus causing energization of the extractor to handle the load at the selected storage location.

Referring now to FIGS. 5 and 6, it will be seen that when the extractor 54 moves out from its generally centered relationship with respect to the elevator portion 50, the switch contact 13LS in line 20, FIGS. 5 and 6 opens (as discussed in Ser. No. 418,048) thus preventing power from being applied to the horizontal drive motors $k$ of the load carrier. Moreover, even though closure of switch contact LS2' occurs as aforedescribed when the locating mechanism moves out of inactive position toward active position, energization of relay 4M Reverse in line 18a, FIGS. 5 and 6 is prevented. However, after the extractor has completed its load handling movements at the selected storage bin, and has returned to its generally centered position on the elevator, switch contact 13LS (line 20, FIG. 6) is reclosed by the extractor. At this time, since switch contact LS2' is also closed as aforediscussed, energization of relay 4M Reverse occurs. Energization of relay 4M Reverse causes normally open contacts 4MR in the pump motor power circuit (FIG. 7) to close, causing reverse energization of the motor 86 and application of fluid to the opposite end of the piston of the fluid powered motor unit 64, thus causing retracting of the locating mechanism and swinging of the latter back to its inactive position with respect to the load carrier. As the locating mechanism swings back to inactive position, it permits switch contact LS1' (line 47a–FIG. 4) to open and when the locating mechanism has been returned to inactive position, the switch contact LS2' (line 18a–FIG. 6) is opened by the actuator 84 on member 58, thereby deenergizing the motor relay 4M Reverse and causing closing of the switch contact LS2''. Since the switch contact 13LS has been previously closed by the extractor movement to its generally centered relationship with respect to the elevator, and since switch contact LS2'' has now been closed, power is supplied to the motor controls for moving the load carrier longitudinally form its existing load handling position.

Referring now to FIGS. 8, 9 and 10 there is diagrammatically illustrated another embodiment of warehousing system incorporating the locating mechanism of the present invention. This embodiment may be referred to as a top running load carrier wherein the load carrier is mounted on rail means 24' which is supported by the storage structure adjacent the upper end thereof. In this embodiment, the generally horizontally oriented carriage 28' with its wheels 30' rotatably mounted is supported on aforementioned laterally spaced rails 24' which are in the embodiment illustrated, disposed in alignment with and supported on the associated aisle posts 20 of the storage sections of 12' and 14'.

The mast structure including the longitudinally spaced vertically extending tracks 32' depend from the upper carriage section 28', with the tracks being rigidified as by means of the truss structure 34' in a generally similar manner as the first described embodiment. While the connections 35' of the truss structure and associated vertical tracks to the carriage 28' may be a generally rigid connection, resilient means such as rubber pads may be provided at the connections 35' to provide a predetermined amount of restricted movement of the truss and track structure with respect to the carriage for facilitating vertical alignment of the mast structure of the load carrier with the storage structure upon actuation of the locating mechanism 56''. The lower end of the conveyor portion of the load carrier includes a frame 36' attached to the vertical tracks 32' and associated rigidifying truss structure. A rail 24a' may be mounted on the floor F of the warehousing complex, running lengthwise of the travel zone or aisle 16' and idler rollers 51' mounted on lower frame 36' are adapted to coact with rail 24a' to guide the longitudinal movement of the lower end of the load carrier in the aisle.

The elevator portion 50' of the load carrier is adapted to move vertically on the tracks 32' in a similar manner as the first described embodiment with the elevator portion 50' supporting a laterally movable extractor portion 54' thereon and in a manner generally identical to the first described embodiment.

Aforementioned locating mechanism 56'' is mounted adjacent the lower end of the load carrier and includes an elongated member 58'' (FIG. 10) pivoted as at 58a' to the lower frame section 36' of the conveyor portion of the load carrier, and having a housing portion 58b'' which is notched or recessed as at 60'' and generally similar to the first described embodiment. Actuator arm portion 78'' projects outwardly of the distal end of housing 58b'' and extends generally diagonally inwardly as shown in FIG. 10. A fluid powered, double acting, reciprocal type motor unit 64'' is provided pivoted as at 66'' to the lower frame 36' with the other end of the motor unit being pivoted as at 70'' to arm 78''. Rollers 62'' are rotatably mounted in housing 58b'' similarly to the first described embodiment and are adapted to coact in rolling gripping engagement with the confronting aisle post 20' of the storage structure upon actuation of the locating mechanism by means of the motor unit 64''. As can be seen in FIG. 10 in the nonactuated or inactive condition of the locating mechanism, the rollers 62'' are completely out of coaction with the confronting post, and when in actuated or active condition (phantom line position) the rollers are disposed on opposite sides of the post in generally engaged relationship therewith.

While a locating mechanism is illustrated on only one side of the FIGS. 8 and 10 embodiment, it will be understood that a similar locating mechanism could be disposed on the opposite side of the lower frame 36' and in a similar manner as discussed in connection with the first described embodiment.

Operation of the FIGS. 8 to 10 embodiment is generally identical to that of the first described embodiment, so that extractor motion for handling a load at a selected storage bin is permissible only when the locating mechanism is in active position locking the load carrier to the storage structure, and horizontal or longitudinal motion of the load carrier from the selected storage bin is permitted only when the locating mechanism has been retracted back to inactive position, and in the same manner as in the first described embodiment, with the limit switches LS1 and LS2 (FIG. 10) and associated actuator 84'' controlling the operation of the control circuitry in the same manner as in the first described embodiment.

From the foregoing discussion and accompanying drawings it will be seen that the present invention provides an automatic warehousing system including an automatic load carrier movable alongside the storage structure of the system for delivering loads to and picking up loads from load storage locations in the storage structure, and wherein locating means is provided for coaction between the storage structure and the load carrier, coupling the load carrier in predetermined position with respect to a selected storage location so that the laterally movable extractor of the load carrier will be in proper position with respect to the selected load storage location, for handling a load thereat, and wherein control means is provided coacting with the locating means to permit extractor movement only when the locating means is in actuated condition between the storage structure and the load carrier and also permitting longitudinal movement of the load carrier with respect to the storage structure only when the locating means is in inactive condition.

The terms and expressions which have been used are used as terms of description and not of limitation and there is no intention in the use of such terms and expressions of excluding any equivalents of any of the features shown or described or portions thereof.

We claim:

1. In an automatic warehousing system comprising a storage structure defining a plurality of horizontally and vertically oriented load storage locations having open load receiving ends defining a generally vertical plane with there being a travel zone alongside said plane, said storage structure comprising spaced, elongated, generally vertically oriented structural components, a load carrier movable horizontally and vertically in said travel zone for inserting loads into and removing loads from said storage structure with there being a running clearance between said load carrier and said storage structure, said load carrier comprising a generally horizontally movable conveyor portion, an elevator portion movable vertically relative to said conveyor portion and an extensible extractor portion on said elevator portion and normally occupying a generally centered position with respect to said elevator portion, said extractor portion being movable from said generally centered position laterally across said running clearance into a selected storage location in said structure for handling a load thereat, a plurality of power means for actuating said load carrier, circuit means connected to said power means, the combination therewith of locating means adapted for movement from an inactive position to an active position for coaction between said storage structure and said load carrier to couple said load carrier in predetermined position with respect to selected of said storage locations, said locating means when in said active position at least partially encompassing a confronting one of said structural components, said circuit means including control means responsive to movement of said load carrier into generally aligned and confronting relation to the selected storage location for automatically activating certain of said power means for the handling of a load by said extractor portion at said selected storage location, said locating means including energizable means responsive to said control means for automatically initiating movement of said locating means to said active position upon movement of said load carrier to said generally aligned and confronting relation to the selected storage location, other control means in said circuit means responsive to movement of said locating means to said active position and actuated by said locating means during its last mentioned movement, said other control means upon actuation thereof being operative to permit energization of said certain power means to initiate movement of said extractor portion from said centered position for handling a load at a selected storage location, further control means in said circuit means responsive to return movement of said extractor portion to said centered position for causing automatic reenergization of said energizable means to cause return movement of said locating means to said inactive position, and said circuit means including means preventing energization of other of said power means to prevent movement of said conveyor portion of said load carrier in said travel zone away from the selected storage location when said locating means is in said active position.

2. A warehousing system in accordance with claim 1, wherein said structural components comprise generally vertical posts disposed in a row alongside said travel zone and supporting generally horizontally oriented load support members thereon adapted for supporting loads in bridging relationship between paired members of said support members, said posts and said load support members defining said storage locations, and said locating means when in said active position adapted for coaction with at least one of said posts for holding the load carrier in said predetermined position with respect to said selected one of said storage locations.

3. A warehousing system in accordance with claim 1 wherein said other control means includes sensing means coacting with said locating means and operable by the latter upon its movement to said active position for permitting actuation of said extractor portion to deposit a load into or remove a load from the selected storage location only when said locating means is in said active position.

4. A warehousing system in accordance with claim 1 wherein said conveyor portion comprises a generally horizontally movable carriage and mast structure projecting generally vertically from said carriage and secured thereto, and wherein said carriage is disposed adjacent one vertical end of said mast structure, said locating means being mounted on said load carrier adjacent the other vertical end thereof.

5. In an automatic warehousing system comprising a storage structure defining a plurality of horizontally and vertically oriented load storage locations having open load receiving ends defining a generally vertical plane and with there being a travel zone alongside said plane, a load carrier movable horizontally in said travel zone for inserting loads into and removing loads from said storage structure with there being a running clearance between said load carrier and said storage structure, said load carrier comprising a vertically elongated conveyor portion movable generally horizontally lengthwise of said travel zone alongside of said plane, said conveyor portion comprising a generally horizontally movable carriage and mast structure projecting generally vertically from said carriage said load carrier also including an elevator portion movable generally vertically on said mast structure alongside said plane and load supporting extractor means on said elevator portion movable generally transversely of said travel zone across said running clearance for depositing a load into or removing a load from the respective storage location at each load handling position, power means for actuating said load carrier, circuit means connected to said power means, locating means mounted on said load carrier adapted for movement from an inactive position to an active position for coaction between said storage structure and said load carrier to couple the load carrier in predetermined position with respect to selected of said storage locations, said circuit means including means preventing energization of at least certain of the power means to prevent movement of said conveyor portion of the load carrier in said travel zone when said locating means is in said active position, said locating means comprising gripping means movably mounted on said load carrier and power means coacting with the gripping means for extending and retracting said gripping means into and from coaction with said storage structure, and wherein said gripping means comprises an elongated member pivoted to said load carrier for pivotal movement in a generally horizontal plane across said running clearance, and spaced roller members mounted on said elongated member and adapted for abutting holding coaction with said storage structure upon predetermined movement of said locating means with respect to said load carrier.

6. A warehousing system in accordance with claim 5 wherein said storage structure comprises generally vertical posts disposed in a row alongside said travel zone and supporting generally horizontally oriented load support members thereon adapted to support loads in bridging relation between paired members of said support members, said posts and said load support members defining said storage locations, said roller members being adapted to engage one of said posts of the selected storage location on opposite sides thereof in the active position of said locating means, said extractor means being adapted to move between said paired load support members at the selected load storage location to handle a load thereat, and the distance between said roller members and the pivotal mounting of said elongated member to said load carrier being at least as great as the distance between the posts of the selected storage location.

7. A warehousing system in accordance with claim 5 wherein said circuit means includes a pair of sensing means mounted on said load carrier, said locating means having an actuator thereon, said actuator in said active position of said locating means coacting with one of said sensing means to permit actuation of said extractor means for handling a load at the selected storage location and to prevent actuation of said extractor means unless said locating means is in said active position at said selected storage location, said actuator coacting with the other of said sensing means in said inactive position of said locating means, said other sensing means comprising said means in said circuit means preventing said horizontal movement of said conveyor portion and being automatically operable upon movement of said locating means away from said inactive position toward said active position, said sensing means comprising limit switches spaced generally laterally with respect to one another, said locating means comprising an elongated arm pivoted to said load carrier adjacent one vertical end of said conveyor portion and spaced rollers mounted on said arm along the lengthwise extent thereof and adapted for holding coaction with said storage structure in said active position of said locating means, and said actuator comprising a lug on said arm adapted for actuating engagement with one of said limit switches in the inactive position of said locating means and adapted for actuating engagement with the other of said limit switches in the active position of said locating means while being spaced from said one limit switch in said active position of said locating means.

8. A warehousing system in accordance with claim 4 including rail means extending lengthwise of said travel zone and supporting said load carrier thereon, said carriage including traction means mounting said carriage on said rail means for providing said generally lengthwise movement of said conveyor portion in said travel zone, and said load carrier including resilient means coacting with said traction means and providing limited movement of said mast structure in a generally vertical plane extending lengthwise of said travel zone, to facilitate vertical alignement of said mast structure with said storage structure upon movement of said locating means to said active position, whereby said extractor can handle a load at the selected storage location without interference occurring between the load and the storage structure.

9. A warehousing system in accordance with claim 1 wherein said locating means includes spaced rollers adapted for gripping coaction with said storage structure in said active position of said locating means, and cushioning means on said rollers comprising rubber cladding on said rollers.

10. A warehousing system in accordance with claim 1 wherein said storage structure includes laterally spaced storage sections defining said travel zone therebetween, and there being locating means disposed adjacent opposite sides of said load carrier, each of said locating means being adapted for coaction between said load carrier and the confronting storage section, said locating means being adapted for actuation in unison to active positions to couple said load carrier to both storage sections.